Patented Dec. 6, 1927.

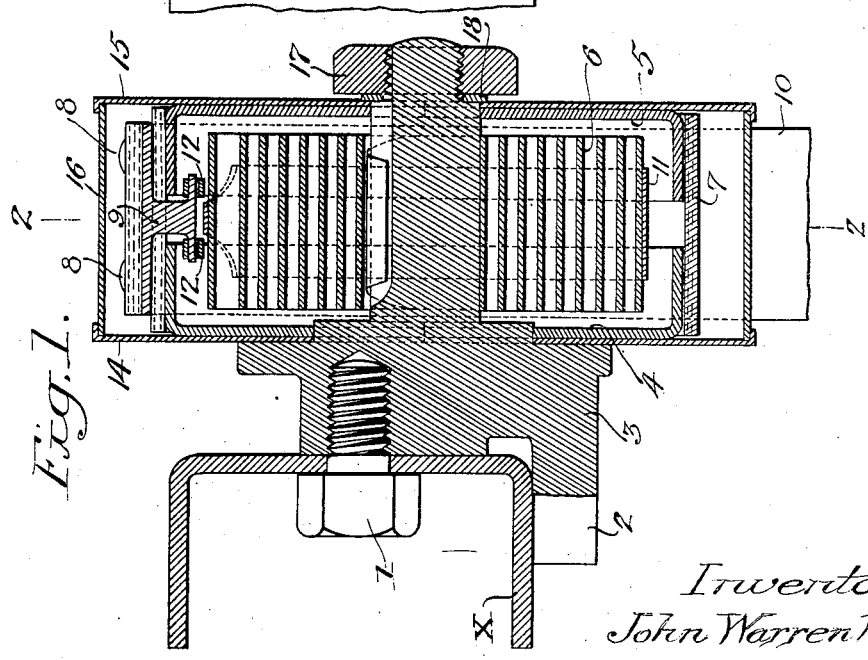

1,652,074

UNITED STATES PATENT OFFICE.

JOHN WARREN WATSON, OF PHILADELPHIA, PENNSYLVANIA, ASSIGNOR, BY MESNE ASSIGNMENTS, TO JOHN WARREN WATSON COMPANY.

RECOIL BRAKE.

Application filed September 1, 1923. Serial No. 660,591.

This invention relates to that class of mechanism intended to check the too rapid separation of the sprung and unsprung portions of a vehicle such as the frame and axle thereof, and has to do more particularly with a novel form of friction member for use in such a device; one object of the invention being to provide a friction member of limited resilience which is capable of holding substantially a predetermined shape.

Another object is to provide a friction member which presents to the strap or equivalent power transmitting element with which it is associated, a relatively smooth surface in order to permit a relatively free limited movement without causing undue friction.

A further object of my invention is to provide a motion retarding device or recoil brake which, by reason of its inclusion of a friction member having the above characteristics, shall be of simplified construction as compared with prior devices of a similar nature.

These objects and other advantageous ends I attain as hereinafter set forth, reference being had to the accompanying drawings, in which, Figs. 1 and 2 are vertical sections, the first taken on the line 1—1, Fig. 2 and the the latter on the line 2—2, Fig. 1.

In the above drawings, X and Y represent relatively movable elements whose motion relative to each other it is desired to check, regulate or control. Attached to the element X by a cap screw 1 and kept from turning with relation to said element by means of a projection 2, is a member 3 which supports two drums 4 and 5 and a spring 6 by suitable means such as squared portions of the member 3 fitting correspondingly squared openings in the sides of said drums. The latter are thus held against rotation relatively to the member 3 and are hence also held with relation to the element X. Rotatably mounted on and approximately conforming to the shape of the outer surface of the drums 4 and 5 is a friction member 7 of some material of limited resilience such as wood, vulcanized fibre, bakelite or other natural or artificial material, which is capable of holding substantially a predetermined shape. Attached to this friction member by means such as rivets 8 is a member 9 which serves to connect it to the spring 6. Also attached to said member 7 by said rivets 8 is a flexible power transmitting member such as a strap 10 connected to the element Y.

Fastened around the spring 6 in any suitable manner, as by having its ends hooked one into the other, is a retaining band 11 designed to facilitate the assemblage of the spring 6 within the drums 4 and 5 and which also serves to maintain said spring within predetermined limits out of contact with the inner surface of said drums regardless of the extent to which said spring may be wound up or unwound. The inner end of the spring is held to the member 3 by suitable means, as by hooking it into a slot suitably formed in said member. The outer end of the spring 6 is also provided with hooks 12—12 extending beyond the band 11 and serving for the attachment of the member 9.

Members 14 and 15 are held to the members 4 and 5 by spot welding or by other suitable means, and with a cover member 16, act to house the entire mechanism and also to maintain a predetermined spacing between the drum members 4 and 5. A nut 17 and lock washer 18 serves to maintain the parts in their relative positions.

In accordance with my invention, the friction member 7 presents to the strap 10 a relatively smooth surface so as to minimize friction between these two elements, and by making said friction member of such material as will possess sufficient inherent stiffness to cause it to maintain a definite and substantially constant shape, I avoid the necessity of providing this member with a supporting backing. The device is thus materially simplified.

Under conditions of use and with the device mounted in the manner illustrated, if the elements X and Y are caused to approach each other, the spring 6 will immediately act to rotate the friction member 7 around the drum members 4 and 5 and thus keep taut the power transmitting member 10 which thereupon is wrapped or laid upon said member 7. As said elements X and Y are caused to separate, frictional resistance to such separation is set up between the friction member 7 and the drum members 4 and 5, because the movement of said member 7 around the latter is resisted at one end by the spring 6 which thus insures its intimate engagement with said drums. The power of the spring 6 may be variously adjusted by removing the nut 17, pulling out the member 3 from the casing 14—16—15 a sufficient distance to disengage the squared portions of said member from the squared openings in the drum members 4 and 5, turning said member 3 either backward or forward one or more revolutions, and then reinserting said member into the holes of the drum members 4 and 5.

While I have illustrated my invention as applied to a motion controlling mechanism employing a pair of drum members and having a specific combination of friction and power transmitting members, it will be understood that said invention is independent of the particular arrangement and construction of the parts of the device, since it has to do primarily with the use of a friction member capable of holding a definite and predetermined shape, in combination with a strap or other power transmitting member to which it presents a relatively smooth surface.

I claim:

1. The combination in a motion retarding device of a supporting drum; a friction member operative on and preformed to hold itself, unaided throughout its entirety, in approximate conformity with said drum; and a power transmitting member overlying and connected to the friction member, the latter presenting a relatively smooth surface to said power transmitting member.

2. In a device for retarding the relative movement of two elements, the combination of a drum member for connection to one of said elements; a friction member curved to conform to said drum member and made of a material capable unaided of maintaining substantially said curvature; with a power transmitting member connected to the friction member and adapted for connection to the second element, the friction member presenting a relatively smooth surface to the power transmitting member.

JOHN WARREN WATSON.